US011242992B2

(12) United States Patent
Guin et al.

(10) Patent No.: US 11,242,992 B2
(45) Date of Patent: Feb. 8, 2022

(54) SELF-ADAPTING GAS TURBINE FIREBOX WITH VARIABLE GEOMETRY

(71) Applicant: OFFICE NATIONAL D'ETUDES ET DE RECHERCHES AÉROSPATIALES, Palaiseau (FR)

(72) Inventors: Christian Guin, Villebon sur Yvette (FR); Florin Paun, Issy les Moulineaux (FR)

(73) Assignee: OFFICE NATIONAL D'ETUDES ET DE RECHERCHES AEROSPATIALES, Palaiseau (FR)

( * ) Notice: Subject to any disclaimer, the term of this patent is extended or adjusted under 35 U.S.C. 154(b) by 176 days.

(21) Appl. No.: 16/603,670

(22) PCT Filed: Apr. 11, 2018

(86) PCT No.: PCT/FR2018/050907
§ 371 (c)(1),
(2) Date: Oct. 8, 2019

(87) PCT Pub. No.: WO2018/189481
PCT Pub. Date: Oct. 18, 2018

(65) Prior Publication Data
US 2021/0108574 A1 Apr. 15, 2021

(30) Foreign Application Priority Data

Apr. 11, 2017 (FR) ...................................... 17 53165

(51) Int. Cl.
*F02C 3/06* (2006.01)
*F23R 3/06* (2006.01)
(Continued)

(52) U.S. Cl.
CPC .................. *F23R 3/06* (2013.01); *F02C 9/20* (2013.01); *F23N 5/047* (2013.01); *F23R 3/14* (2013.01);
(Continued)

(58) Field of Classification Search
CPC ...... F23R 3/06; F23R 3/14; F23R 3/26; F23R 3/22; F23N 5/047; F02C 9/20
See application file for complete search history.

(56) References Cited

U.S. PATENT DOCUMENTS 3,577,878 A * 5/1971 Greenwood ............... F23R 3/26
60/39.23
3,691,761 A * 9/1972 Jackson .................... F23R 3/26
60/39.23
(Continued)

FOREIGN PATENT DOCUMENTS

EP 0964206 A1 12/1999
FR 2452599 A1 10/1980
(Continued)

OTHER PUBLICATIONS

International Search Report, dated Jul. 4, 2018, from corresponding PCT application No. PCT/FR2018/050907.
(Continued)

*Primary Examiner* — Katheryn A Malatek
(74) *Attorney, Agent, or Firm* — Nixon & Vanderhye

(57) ABSTRACT

A self-adapting gas turbine firebox with variable geometry includes at least one system with variable opening for automatically adjusting a combustion configuration inside a combustion chamber according to an air temperature, particularly of air from a compressor. The adjustment is performed by a thermosensitive member that controls at least one cross-sectional area of a passage to the combustion chamber, for air which participates in the combustion of fuel
(Continued)

or participates in a dilution of gases effective inside the combustion chamber.

20 Claims, 6 Drawing Sheets

(51) Int. Cl.
  *F02C 9/20* (2006.01)
  *F23N 5/04* (2006.01)
  *F23R 3/14* (2006.01)
  *F23R 3/26* (2006.01)
(52) U.S. Cl.
  CPC .......... *F23R 3/26* (2013.01); *F05D 2220/323* (2013.01); *F05D 2270/303* (2013.01); *F05D 2270/313* (2013.01)

(56) References Cited

U.S. PATENT DOCUMENTS

| | | | | |
|---|---|---|---|---|
| 3,765,171 A | * | 10/1973 | Hagen | F23R 3/26 60/39.23 |
| 4,296,599 A | * | 10/1981 | Adamson | F02C 7/18 415/115 |
| 4,606,190 A | | 8/1986 | Greene et al. | |
| 2011/0011054 A1 | | 1/2011 | Bulat et al. | |
| 2012/0015309 A1 | * | 1/2012 | Stewart | F23R 3/14 431/9 |
| 2016/0084167 A1 | | 3/2016 | Birnkrant et al. | |

FOREIGN PATENT DOCUMENTS

| | | |
|---|---|---|
| FR | 2779807 A1 | 12/1999 |
| GB | 2244551 A | 12/1991 |
| RU | 2010 144 521 A | 5/2012 |
| RU | 2 753 202 C1 | 8/2021 |

OTHER PUBLICATIONS

Offical Action and Search Report issued in RU Patent Application No. 2019135837 dated Nov. 23, 2021, with English Machine Translation provided.

* cited by examiner

SELF-ADAPTING GAS TURBINE FIREBOX WITH VARIABLE GEOMETRY

The present invention relates to a self-adapting gas turbine firebox with variable geometry, and a turbomachine incorporating such a firebox.

BACKGROUND OF THE INVENTION

It is known that the combustion of fuel inside the combustion chamber of a turbomachine has carbon monoxide, combustion residue, and nitrogen oxide emission properties which vary according to the power setting of the turbomachine. Primarily, the carbon monoxide and combustion residue emissions increase sharply when the power setting decreases, and the nitrogen oxide emissions increase when the power setting increases. When the turbomachine is an aircraft turbojet, a high power setting is used at takeoff and then when cruising, while a low power setting is used at landing and for taxiing, and also corresponds to the conditions of in-flight reignition of the turbojet engine. To reduce these emissions regardless of the power setting, it is conceivable to use gas turbine fireboxes of variable geometry. Such fireboxes of variable geometry have at least a first combustion air inlet which leads upstream into the combustion chamber, and at least a second combustion air inlet which leads downstream into the same combustion chamber. The introduction of combustion air into the chamber is thus increased upstream and simultaneously reduced downstream when the power setting increases, producing a combustion that is poorer in fuel. Conversely, the introduction of combustion air into the chamber is reduced upstream and simultaneously increased downstream when the power setting decreases, producing a combustion that is richer in fuel. For example, document FR 2 779 807 proposes using one or more valves or other closure means to automatically control a variable rate of intake of combustion air into the combustion chamber, based on the air pressure in the turbomachine. However, the implementation of the variable geometry which is described in document FR 2 779 807 is complex, disadvantageous in terms of size and mass, and difficult to make compatible with the temperature, pressure, vibration, and air flow velocity conditions which exist in a turbomachine.

Furthermore, document FR 2 452 599 proposes automatically adjusting the combustion chamber bypass air flow rates, in order to cool components of the turbine, particularly its fixed and moving blades. The automatic adjustment is made in response to parameters such as the pressure or temperature of the air coming from the compressor of the turbomachine. For example, valves are carried by bimetal strips, in order to vary the cross-sectional areas open for the passage of air from the compressor. The adjustment that is thus made varies according to the temperature of the cooling air, which comes from the compressor. However, the concept and the devices described in document FR 2 452 599 do not correspond to fireboxes having a variable geometry in order to optimize combustion according to the power setting.

SUMMARY OF THE INVENTION

Based on this situation, one object of the present invention is to improve the automatic adjustment of a combustion configuration in a turbomachine firebox, so that the emission characteristics of carbon monoxide and nitrogen oxides, as well as the energy efficiency of the turbomachine, are optimized for its different power settings.

A subsidiary object is to obtain such an automatic adjustment that is simple, robust under the thermal and vibratory conditions that exist near a combustion chamber, and inexpensive.

For this purpose, a first aspect of the invention provides a gas turbine firebox which comprises:
- a combustion chamber;
- an air supply system, in particular for supplying air exiting a compressor, which is arranged to supply the combustion chamber with at least one stream of air having a variable temperature; and
- at least one system with variable opening, itself comprising:
  - an intake passage, which is arranged to allow the stream of air coming from the air supply system to enter the combustion chamber,
  - a movable closure member, which changes an open cross-sectional area of the intake passage when moved, and
  - a thermosensitive member, having a shape which varies depending on the temperature of this thermosensitive member, and which is arranged in the stream of air between the air supply system and the intake passage, and which is connected to the closure member so that a deformation of the thermosensitive member causes the closure member to move.

According to the invention, the intake passage is arranged with respect to the combustion chamber so that the air entering this chamber through this intake passage is air that participates in the combustion of a fuel, or air that participates in a dilution of the gases effective inside the combustion chamber. In this manner, the turbine firebox is of variable geometry, but in addition is self-adapting so that it automatically adjusts the combustion configuration inside the combustion chamber according to the operational power setting of the turbine firebox.

In particular, an alternation between a first combustion configuration for a low operational power setting, with a fuel-rich flame zone located at the bottom of the combustion chamber and followed by a dilution zone, and another combustion configuration for a high operational power setting, in which the combustion is fuel-poor and without a dilution zone, can be obtained in this manner.

The air which is concerned by the invention, and for which the flow rate into the combustion chamber is adjusted automatically according to the air temperature that exists upstream of the combustion chamber, is air which participates in the combustion of fuel, or in the dilution of the gases in the combustion chamber, or both. In other words, this air whose flow rate is adjusted according to the invention makes it possible to modify the configuration—or the geometry—of the combustion that occurs in the turbine firebox.

The use of a thermosensitive member having a shape which varies according to the temperature of this member, and which is mechanically connected to the closure member in order to move the latter, constitutes an adjustment device which is simple, robust under the thermal and vibratory conditions that exist near the combustion chamber, and inexpensive.

In different embodiments of the thermosensitive member, the member may comprise a portion made of a shape-memory alloy, or a bimetal strip assembly.

In first embodiments of the thermosensitive member, the shape-memory alloy has a "low temperature" phase, called martensite, and a "high temperature" phase, called austenite, and reversibly changes from one phase to the other at a transition temperature which is called the martensitic transformation temperature. The portion made of such an alloy may have geometric shapes that are different between the two phases, so that the portion reversibly changes its geometric shape when its temperature increases or decreases to pass the value of the martensitic transformation temperature. Compositions of such shape-memory alloys are well known to those skilled in the art and are also categorized in detail. As examples, we can cite the families of titanium-nickel and copper-aluminum alloys, designated by the main components of these alloys.

In second embodiments of the thermosensitive member, the bimetal strip assembly is composed of at least two portions made of materials which have different respective values for the coefficient of thermal expansion, and which are connected to each other. A relative dimensional variation of the two portions of materials, caused by a change in temperature undergone by the thermosensitive member, thus produces a deformation of the latter. In some embodiments that are suitable for very high temperatures, the two portions of the bimetal strip assembly can be welded to one another by cold rolling.

In first embodiments of the system with variable opening, the thermosensitive member may be adapted so that it itself reversibly actuates the closure member. In other words, it can be adapted to first provide sufficient energy to cause the closure member to move from any initial position, when this thermosensitive member undergoes a first change in temperature from an initial temperature value. But it is also adapted to then provide additional energy which is sufficient to cause a reverse movement of the closure member when the thermosensitive member undergoes a second change in temperature, following the first change in temperature and in the opposite direction, so that the closure member is once again in its initial position when the temperature of the thermosensitive member is again equal to its initial value.

In second embodiments of the system with variable opening, the thermosensitive member may be adapted so that it itself actuates the closure member but in only one direction. It must then be combined with a return member, so that the latter moves the closure member in the opposite direction, in a manner that is limited by the thermosensitive member. In other words, the thermosensitive member can be further adapted to provide sufficient energy to cause the closure member to move from an initial position when it undergoes a first change in temperature from an initial temperature value. But it is the return member that produces the extra energy for the reverse movement of the closure member when the thermosensitive member undergoes the second change in temperature, so that the closure member is once again in its initial position when the temperature of the thermosensitive member is again equal to its initial value.

A first type of embodiment of the invention relates to the adjustment of the combustion air which is admitted into the combustion chamber, in an upstream portion thereof. For this first type of embodiment, the system with variable opening may be arranged on an air supply swirler of the injection system of the combustion chamber, in order to vary the intake flow rate of the combustion air coming from the air supply system and entering the combustion chamber through this air supply swirler. This swirler is located axially upstream of the combustion chamber, relative to a general direction of the flow of air into the combustion chamber during operation. The closure member may then comprise a ring with openings which laterally surrounds the air supply swirler, so that the openings are aligned or offset relative to channels of the air supply swirler, in order to vary the cross-sectional area of the access to the channels, according to the angular position of the ring around the air supply swirler. The variable cross-sectional area thus created for the access to the channels of the air supply swirler forms the open cross-sectional area of the intake passage.

Advantageously, the system with variable opening may then be arranged to reduce the open cross-sectional area of the intake passage when the temperature of the air coming from the air supply system decreases, and to increase this open cross-sectional area of the intake passage when this air temperature increases. The case of an air supply temperature which has decreased corresponds to an operating mode which has dropped to a lower power setting for a turbomachine comprising the turbine firebox, and the case of an air temperature which has increased corresponds to an operating mode which has risen to a higher power setting.

This first type of embodiment of the invention can be combined with the first or second embodiments of the thermosensitive member which were described above, and also with the first or second embodiments of the system with variable opening which also were described above, all combinations thereof being comprised in the invention.

In particular, the thermosensitive member may constitute at least a portion of a blade which is carried by the ring, located in the stream of air coming from the air supply system. It can then be adapted to impart tilts and/or directions of curvature to the blade which are the inverse of one another, between at least two temperature values of the air coming from the air supply system, so as to rotate the ring by aerodynamic force in one direction or in the opposite direction around the air supply swirler.

Alternatively, the ring may carry at least one blade which is located in the stream of air coming from the air supply system, and which has a fixed tilt or curvature so as to rotate the ring by aerodynamic force towards a rest position, to form the return member. The thermosensitive member can then be arranged to move the ring away from the rest position, by rotating it against the force of the return member.

A second type of embodiment of the invention relates to the adjustment of the dilution air which is introduced into a downstream portion of the combustion chamber. For this second type of embodiment, the system with variable opening may be arranged to vary the intake flow rate of the dilution air coming from the air supply system and entering the combustion chamber through a side wall thereof, relative to a general flow of air into the combustion chamber during operation.

Advantageously, the system with variable opening can then be arranged to increase or produce the open cross-sectional area of the intake passage when the temperature of the air coming from the air supply system decreases, and to reduce or eliminate this open cross-sectional area of the intake passage when this air temperature increases. The case of the air supply temperature which has decreased (respectively increased) again corresponds to a mode of operation which has dropped to a lower (respectively higher) power.

This second type of embodiment of the invention can also be combined with the first or second embodiments of the thermosensitive member which were described above, and with the first or second embodiments of the system with variable opening which also were described above, all combinations thereof again being comprised in the invention.

In particular, the thermosensitive member may constitute a portion of a lever which carries the closure member, or a portion of a reversible actuator which is arranged to move the closure member. In the latter case, the thermosensitive member may constitute at least a portion of a blade which is located in the stream of air coming from the air supply system. The thermosensitive member is then adapted to impart tilts or directions of curvature to the blade which are the inverse of one another, between at least two temperature values of the air coming from the air supply system, so as to move the closure member by aerodynamic force in one direction or in the opposite direction in order to reversibly vary the open cross-sectional area of the intake passage.

Alternatively, a lever which carries the closure member may further carry at least one blade which is located in the stream of air coming from the air supply system, and which has a fixed tilt or curvature so as to rotate the lever by aerodynamic force towards a rest position, to form the return member. The thermosensitive member can then be arranged to move the lever away from the rest position by rotating the lever against the force of the return member.

Possibly, a turbine firebox according to the invention may combine adjustments of the combustion air and the dilution air, by comprising both a first system with variable opening in accordance with the first type of embodiments of the invention, and a second system with variable opening in accordance with the second type of embodiments of the invention. The first and second systems with variable openings are then adapted to simultaneously vary the open cross-sectional area of the intake passage of the first system with variable opening and that of the second system with variable opening, in opposite variation directions, when the temperature varies of the stream of air in which are arranged the thermosensitive members of the two systems with variable openings. Preferably, the open cross-sectional areas of the two intake passages vary simultaneously so that the total mass flow rate of the air entering the combustion chamber remains substantially constant during simultaneous variations of the two systems with variable openings. In addition, the total pressure drop that is effective for this total flow rate of the air admitted into the combustion chamber can advantageously also be constant during simultaneous variations of the two systems with variable openings.

In addition, in the systems with variable openings, the use of thermosensitive members of a same type which are arranged in the upstream and downstream portions of the combustion chamber ensures automatic synchronization of the changes in the air flow rates controlled by these systems.

A second aspect of the invention provides a turbomachine which comprises an air compressor, a turbine firebox which is in accordance with the first aspect of the invention, and a turbine. Such a turbomachine is arranged so that the compressor constitutes a source of air for the air supply system of the turbine firebox, and so that gases from the turbine firebox actuate the turbine, the turbine driving the compressor.

Such a turbomachine is particularly suitable for forming part of a commercial airliner turbojet engine. The power settings mentioned then correspond to different phases of flight: takeoff and cruising for the high power settings, landing and taxiing, as well as in-flight reignition, for the low power settings.

BRIEF DESCRIPTION OF THE DRAWINGS

Other features and advantages of the invention will be apparent from the following description of several non-limiting exemplary embodiments, with reference to the appended drawings in which.

DETAILED DESCRIPTION OF THE PREFERRED EMBODIMENTS

For clarity, the dimensions of the elements represented in these figures do not correspond to their actual dimensions or to the ratios of their actual dimensions, or to the exact shapes when these shapes do not depend on the invention. In addition, some elements of the devices described are only represented symbolically or in principle, or are not represented at all, when they do not participate directly in implementing the invention. This is the particular case of the fuel injection system which is located at the center of the air supply swirler but which has not been represented, in order to more clearly reveal the parts directly related to the invention. In addition, identical references indicated in different figures denote identical elements or those of identical function.

Figure 1:
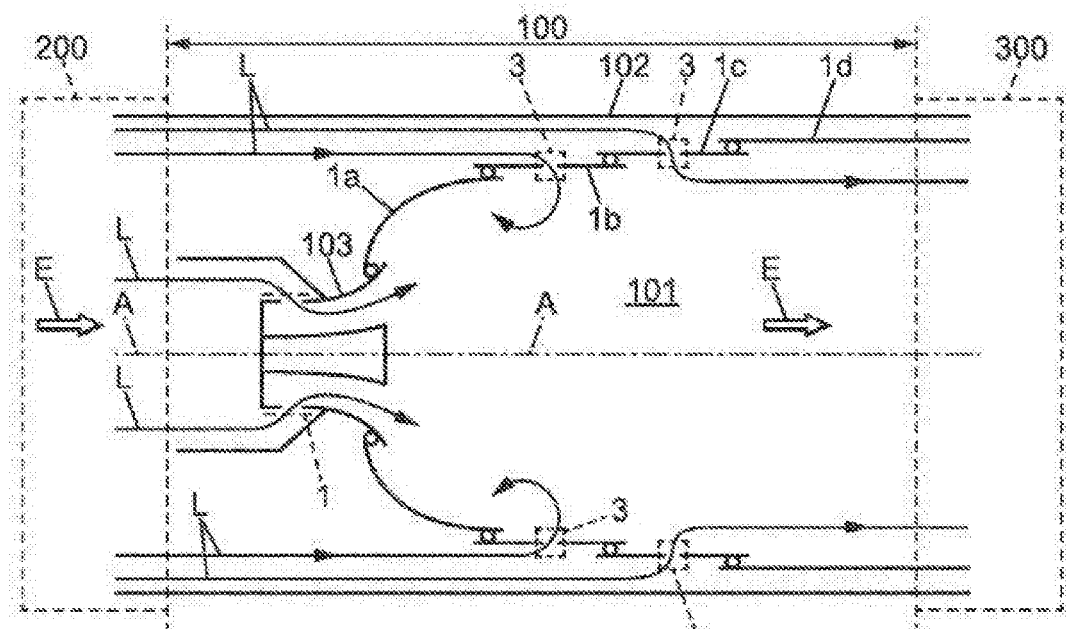
FIG. 1 is a cross-sectional view of a turbomachine to which the invention can be applied.

The invention can be applied to a turbomachine as represented in FIG. 1. Such a turbomachine comprises a turbine firebox 100, a compressor 200, and a turbine 300.

The turbine firebox 100 itself comprises a combustion chamber 101, an air supply system, and at least two systems with variable openings.

The combustion chamber 101 may have different designs, for example a chamber with a side wall formed by a succession of rings 1a, 1b, 1c and 1d. In other designs of the combustion chamber 101, its side wall may be porous or have multiple perforations.

The air supply system comprises at least one external pipe 102 for guiding air coming from the compressor 200 to air inlets of the combustion chamber 101. The arrows that are denoted by the letter E in FIG. 1 indicate the general direction of the air flow in the turbomachine, from the compressor 200 to the turbine 300 through the combustion chamber 100. The L references indicate the air streamlines. Depending on the altitude of an aircraft equipped with the turbomachine, and the mode of operation of the turbomachine, for example a high power setting for the aircraft's takeoff or a low power setting for taxiing the aircraft or for a cold restart of the turbomachine, the air temperature exiting the compressor 200 can vary between about −40° C. and about 630° C.

A system with variable opening is placed in the path of the air flow between the supply system and certain air inlets of the combustion chamber 101. In particular, a system with variable opening 1 may be axially arranged through the upstream wall of the combustion chamber 101, in order to adjust the combustion air flow, called the primary air flow in the terminology of the skilled person. In combination, one or more system(s) with variable opening(s) 3 may be arranged to traverse some of the segments 1*a*-1*d* of the side wall of the combustion chamber 101, each of these systems being intended to adjust a dilution air flow. All of these systems with variable openings 1 and 3 are adjusted during operation of the turbomachine according to its mode of operation, corresponding to a delivered power that is high or low. In particular, when this power increases, system with variable opening 1 is adjusted to increase the primary air flow, and systems 3 are adjusted simultaneously to reduce or eliminate the dilution of the combustion flame. In contrast, when the power delivered by the turbine engine decreases, system with variable opening 1 is adjusted to reduce the primary air flow, and systems with variable openings 3 are simultaneously adjusted to increase the dilution of the flame. The adjustments to the systems with variable openings 1 and 3 are preferably made so that the total mass flow rate of the air entering the combustion chamber 101 and the pressure loss of the flow remain substantially constant during the geometry transition of the firebox.

According to the invention, at least one among the systems with variable openings 1 and/or 3 is automatically and autonomously adjusted according to the temperature of the air in the pipe 102 upstream of this (these) system(s) with variable opening(s).

Figure 2A:
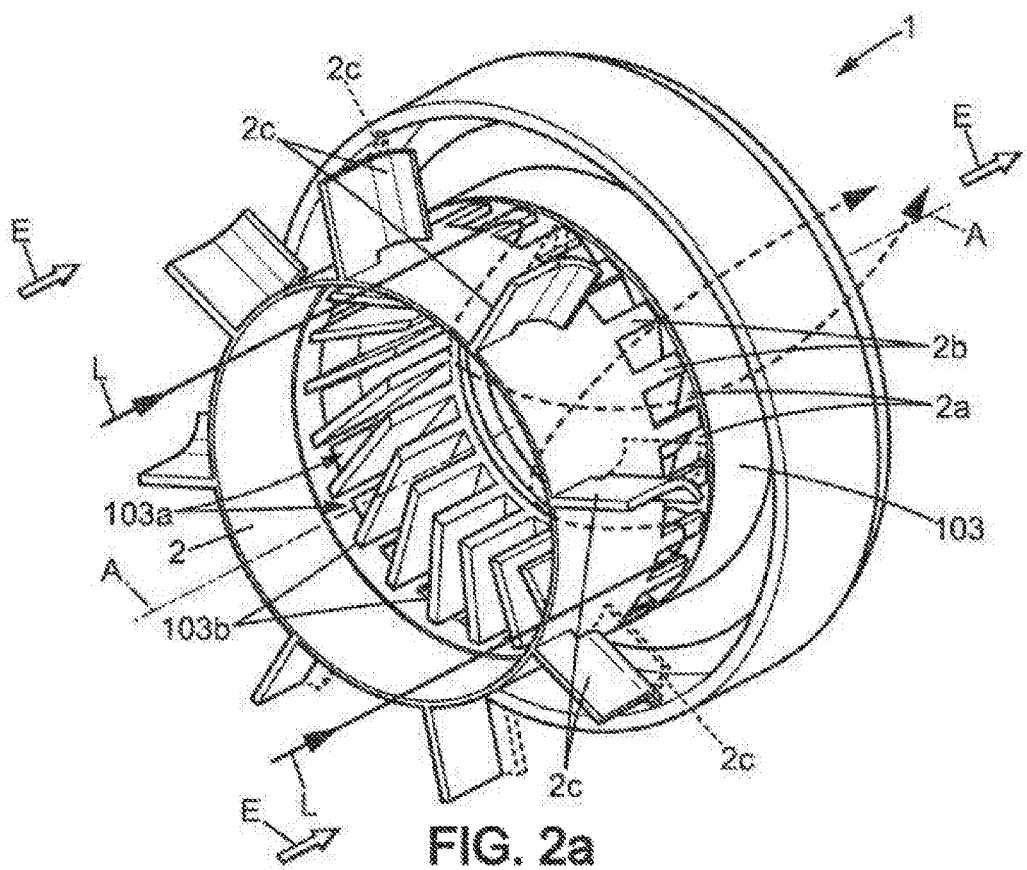
FIG. 2a is a perspective view of a combustion air supply swirler, which is combined with a first embodiment of a system with variable opening used by the invention.

The invention is now described firstly for system with variable opening 1, with reference to FIG. 2*a*. The air supply system comprises a supply swirler 103. This supply swirler has channels 103*a* for the combustion air, which lead through the upstream wall of the combustion chamber 101, also called the bottom wall of the combustion chamber. Two channels 103*a*, which are adjacent in the ring 103, are separated by an intermediate partition 103*b* also called a bucket. External peripheral openings of the channels 103*a* are distributed around an axis A-A. They form an intake passage allowing the entry of air from the compressor 200 into the intake chamber 101. A ring 2 with openings is placed around the swirler 103, in front of the outer peripheral openings of the channels 103*a*, able to be rotated about the axis A-A between two rotation-limiting stops. In the ring 2, openings 2*a* alternate with shutter segments 2*b* at the outer peripheral openings of the channels 103*a* of the supply swirler 103. Then, in a position of the ring 2 which corresponds to a cross-sectional area of maximum access to the channels 103*a* of the swirler 103 for the air coming from the compressor 200, the openings 2*a* of the ring 2 are coincident with those of the channels 103*a* of the swirler 103. Such a position of the ring 2 which produces the cross-sectional area of maximum access is shown in the left half of FIG. 2*b*. When the ring 2 is rotated gradually from this position, the shutter segments 2*b* come into position partially in front of the outer peripheral openings of the channels 103*a* of the swirler 103, and thus reduce the cross-sectional area of access to the channels 103*a* for the air from the compressor 200. This other position of the ring 2, which produces a reduced cross-sectional area of access, is shown in the right half of FIG. 2*b*. The primary air flow entering the combustion chamber 101 is thus adjusted by rotating the ring 2 about the axis A-A. The ring 2 thus forms the closure member mentioned in the general part of the present description. The rotational directions denoted O and F for the ring 2 in FIG. 2*b* respectively correspond to the progressive increase and progressive decrease of the cross-sectional area of access to the channels 103A of the swirler 103, and thus the respective increase and decrease of the cross-sectional area of the opening of the intake passage to the combustion chamber 101 for the primary air flow.

According to a first embodiment of the invention which is further illustrated in FIG. 2*a*, the ring 2 is provided with blades 2*c*, for example upstream of the openings 2*a* and the shutter segments 2*b*. These blades 2*c* are located in the stream of air from the compressor 200 before this stream partially enters the channels 103*a* of the swirler 103 or flows around the combustion chamber 101. The blades 2*c* are composed at least in part of a shape-memory alloy, so that they each have a curvature of variable direction. For example, when the air upstream of the swirler 103 has a temperature above the martensitic transformation temperature of the shape-memory alloy, the curvature of the blades 2*c* (blade profiles indicated with solid lines in FIG. 2*a*) is such that the flow of air from the compressor 200 pushes the ring 2 in the direction of rotation O indicated in FIG. 2*b*, to increase the cross-sectional area of the access to the channels 103*a* of the swirler 103. Conversely, when the air temperature is less than the martensitic transformation temperature, the direction of curvature of the blades 2*c* is reversed (blade profiles indicated with dashed lines in FIG. 2*a*) so that the flow of air from the compressor 200 pushes the ring 2 in the direction of rotation F indicated in FIG. 2*b*, to reduce the cross-sectional area of the access to the channels of the swirler 103. In this first embodiment, the blades 2*c* of shape-memory alloy constitute the thermosensitive member mentioned in the general part of this description. They allow automatically and reversibly adjusting the cross-sectional area of the access to the channels 103*a* of the swirler 103, causing rotation of the ring 2 in direction F when the temperature of the air from the compressor 200 falls below the martensitic transformation temperature, and in direction θ when this air temperature rises above the martensitic transformation temperature.

Figure 2B:
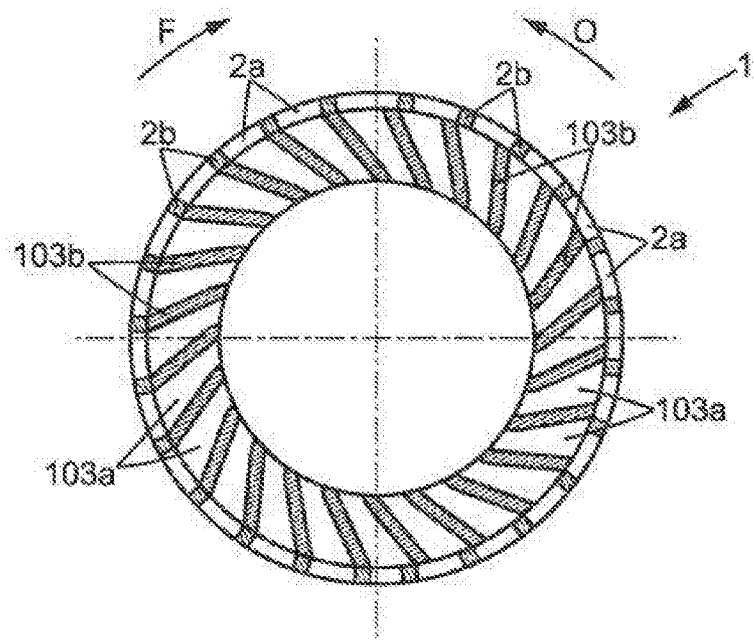
FIG. 2b is a cross-sectional view of the supply swirler and the system with variable opening of FIG. 2a, for two different opening values.
Figure 2C:
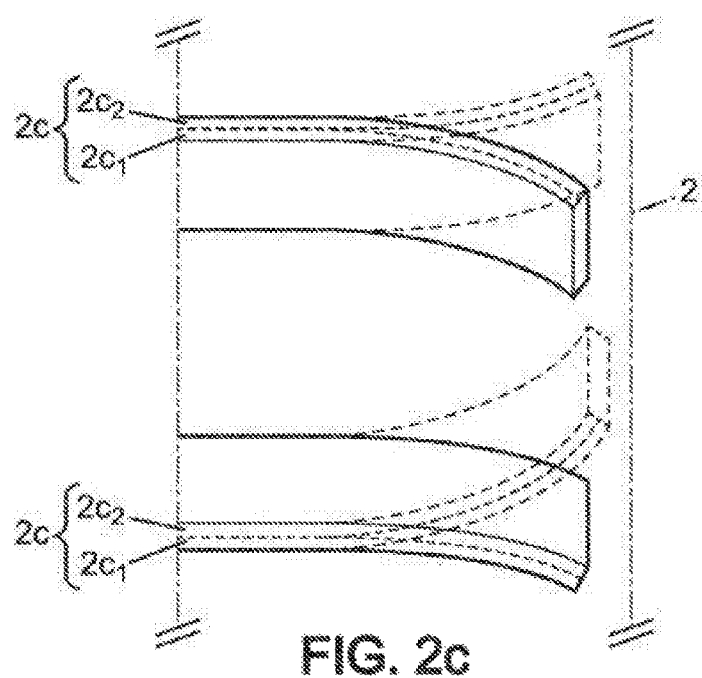
FIG. 2c is a detail view of part of FIG. 2a, for an alternative embodiment of the thermosensitive members.

FIG. 2*c* illustrates an alternative embodiment, where each blade 2*c* of the ring 2 has a bimetal strip assembly in its reversible curvature portion. Such an assembly may consist of two segments $2c_1$ and $2c_2$ which are laminated together, for example by cold rolling, so that each forms part of the thickness of the reversible curvature portion of the blade. The segment which is concave at lower temperatures, for example segment $2c_1$ for the blade profiles indicated with solid lines in FIG. 2*c*, consists of a material which has a coefficient of thermal expansion that is greater than that of the material of the other segment, $2c_2$ in the example under consideration. A suitable choice of materials for segments $2c_1$ and $2c_2$, and of their thicknesses, which lies within the reach of the skilled person, allows obtaining a curvature for each blade 2*c* which reverses at high temperatures (blade profiles indicated with dashed lines in FIG. 2*c*).

Figure 2D:
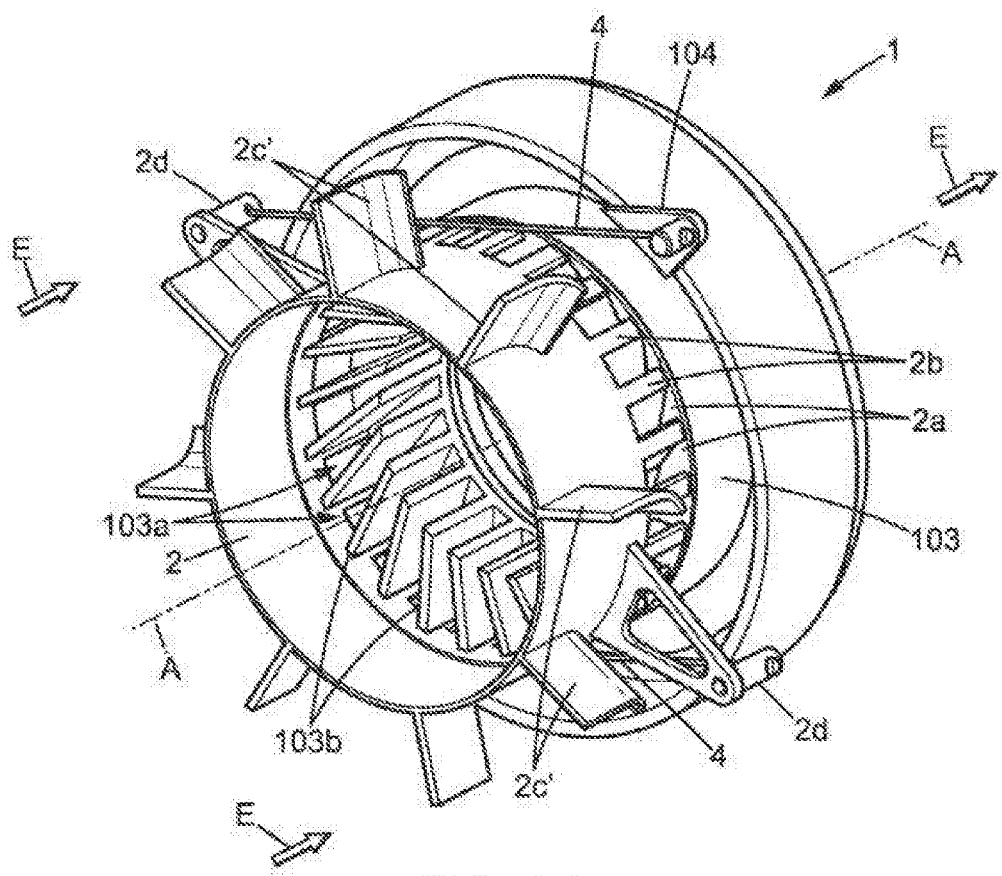
FIG. 2d corresponds to FIG. 2a, for a second embodiment of the system with variable opening used by the invention.

In a second embodiment of the invention which is illustrated in FIG. 2*d*, the blades of the ring 2, now denoted 2*c*', have fixed curvatures in the air flow from the compressor, in order to push the ring 2 in direction of rotation O. The ring 2 and the air supply system are then respectively provided with arms 2*d* and 104, which are connected one-to-one by a cable 4 of shape-memory alloy. The cable 4 may be designed so that it possesses, at a temperature greater than the martensitic transformation temperature, an effective length which is greater than that below the martensitic transformation temperature. Thus, an increase in the temperature of the air from the compressor 200, to just above the martensitic transformation temperature, frees the ring 2 to rotate. The blades 2*c*' cause it to rotate in direction O. Conversely, when the temperature falls back down to below the martensitic transformation temperature, this causes the cable 4 to shorten, which causes the ring 2 to rotate in direction F. In other words, the blades 2c' constitute a return member which, due to the aerodynamic force produced by the stream of air E on the blades 2c', returns the ring 2 to the position which corresponds to the largest open cross-sectional area for the intake passage of the primary air flow into the combustion chamber 101.

The third embodiments of the invention, which are now described with reference to FIGS. 3a and 3b, concern one of these systems with variable openings 3 which is installed on the side wall of the combustion chamber 101, in a downstream part thereof. As already stated, such a system is intended to adapt a dilution air flow admitted into the combustion chamber 101, according to the current power setting for the turbomachine. The side wall of the combustion chamber 101 is provided with an orifice 5, and a valve 6 acting as a closure member is supported by a base 8 via a lever 7. The base 8 is preferably made of a thermally insulating material integral with the side wall of the combustion chamber 101. The lever 7 is located in the air flow E coming from the compressor 200. It is designed to apply the valve 6 over the orifice 5 when the temperature of the air coming from the compressor 200 is high, corresponding to a high power setting of the turbomachine, and to move the valve 6 away from the orifice 5 when the temperature of the air coming from the compressor 200 is lower, corresponding to a low power setting. Thus, a stream of dilution air enters the combustion chamber 101 for the low power setting, and is suppressed for the high power setting.

Figure 3A:
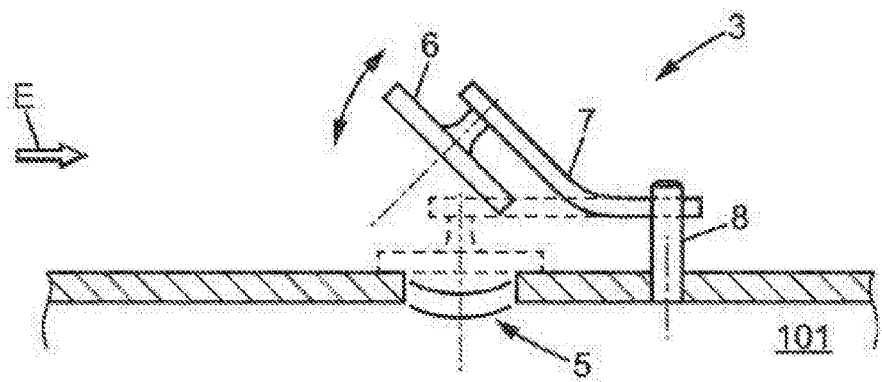
FIGS. 3a-3d are perspective or section views which show other exemplary embodiments of the invention, for a dilution air inlet.

In the embodiment illustrated in FIG. 3a, at least one segment of the lever 7 is constituted by a portion of shape-memory alloy, so that the lever 7 is bent in the martensite transformation phase such that the valve 6 is moved away from the orifice 5, and is straight in the austenite phase such that the valve 6 is applied over the orifice 5. Obviously, other geometrical configurations for the lever 7 and the base 8 can be used in an equivalent manner.

Figure 3B:
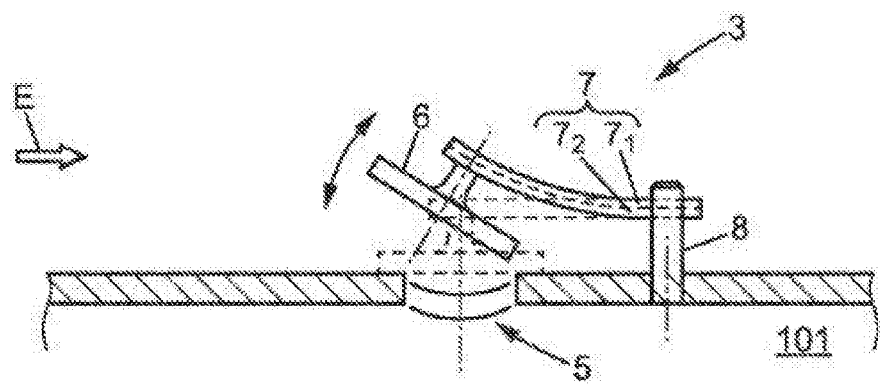

In an alternative embodiment to that of FIG. 3a, and which is illustrated in FIG. 3b, the portion of shape-memory alloy which constitutes the lever 7 is replaced by a bimetal strip assembly as described with reference to FIG. 2c. The segments of this bimetal strip assembly are denoted $7_1$ and $7_2$. Segment $7_1$, which has a greater coefficient of thermal expansion than that of segment $7_2$, constitutes the face of the lever 7 which is concave at lower temperatures, or at least a portion of this face. The thicknesses of the two segments $7_1$ and $7_2$ of the lever 7, and their respective materials, are chosen in a manner within the reach of the skilled person, so that the operation of the bimetal strip assembly reversibly applies the valve 6 over the orifice 5 when the temperature of the air coming from the compressor 200 is high, and moves the valve 6 away from the orifice 5 when this air temperature decreases.

Figure 3C:
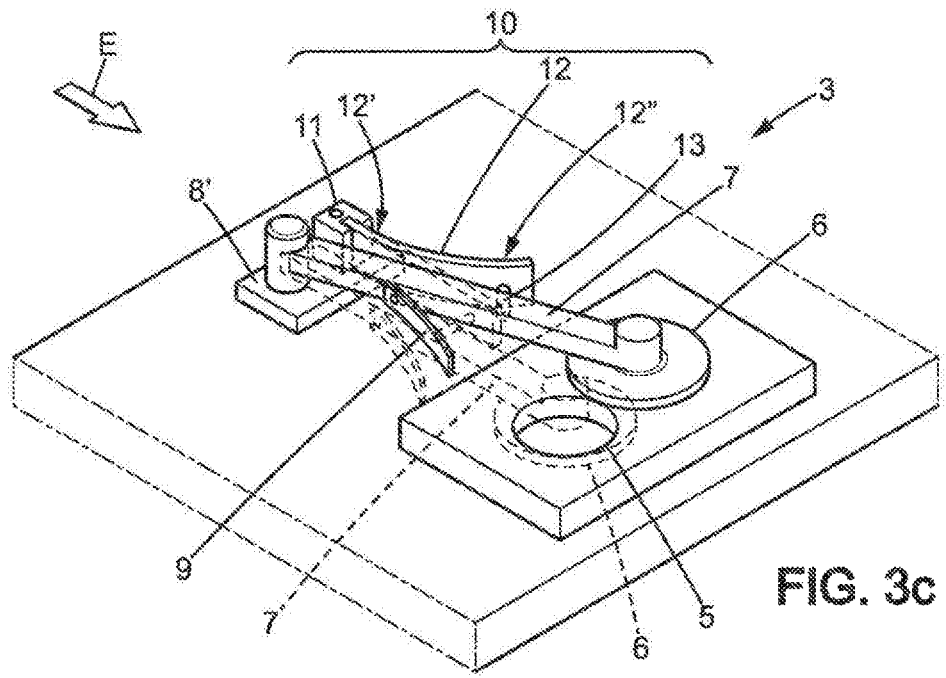

In a third embodiment of the invention which is illustrated in FIG. 3c, the base 8' is configured to allow the lever 7 to rotate in a plane parallel to the outer side surface of the combustion chamber 101. Thus the valve 6, which is carried by the lever 7, slides on the outer side surface of the combustion chamber 101 between a position which is offset relative to the orifice 5 (represented with solid lines), the orifice then being open, and a position in which the valve 6 covers the orifice 5 (represented with dashed lines). The lever 7 rigidly carries a curved fin 9, of fixed shape, which is located in the air flow E coming from the compressor 200. In this manner, the lever 7 is returned to the open position of the orifice 5 by the aerodynamic force produced by the air flow E on the fin 9. The fin 9 in the air flow E thus forms a return member for returning the system with variable opening to the open position of the orifice 5. This open position corresponds to the rest position mentioned in the general part of the present description. An actuator 10 comprises another base 11, which can also be fixed to the wall of the combustion chamber 101, another lever 12 which is rigidly held at an attachment end 12' in the base 11, and a thrust finger 13. The thrust finger 13 is attached to a distal end 12" of the lever 12, which is opposite to the attachment end 12'. The lever 12 may have a portion of shape-memory alloy which is designed so that, in the martensite phase, the lever 12 has a retracted shape (represented with solid lines in FIG. 3c) to allow the fin 9 to push the valve 6 into the position that is away from the orifice 5. The lever 12 is simultaneously designed so that, during its transition to its austenite phase, it pushes the lever 7 by means of the finger 13, until the valve 6 is brought over the orifice 5 and closes it.

In an alternative embodiment to that of FIG. 3c, the portion of shape-memory alloy which constitutes the lever 12 of the actuator 10 may be replaced by a bimetal strip assembly as described with reference to FIG. 2c. Such an embodiment will be apparent to those skilled in the art given the descriptions already provided, so it is not necessary to describe it further.

Figure 3D:
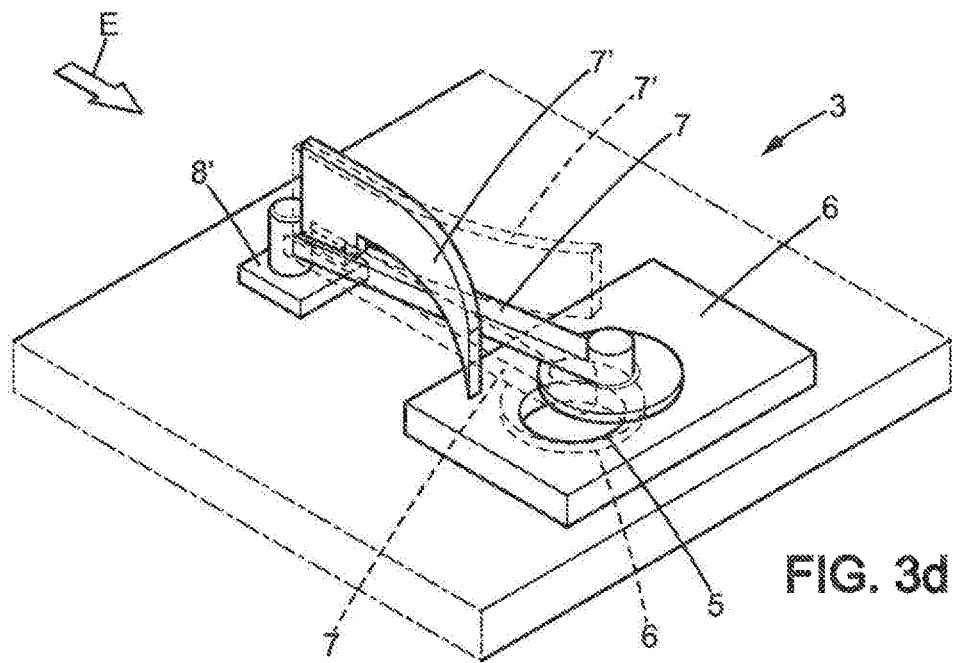

Yet another alternative embodiment is illustrated in FIG. 3d. In comparison to the embodiment of FIG. 3c, the actuator 10 is eliminated and a blade having an invertible tilt and/or curvature 7' is carried by the lever 7. The blade 7' may have a portion of shape-memory alloy as described for the blades 2c of the embodiment of FIG. 2a, or may have a bimetal strip assembly as described for the blades 2c' of the embodiment of FIG. 2c. This other embodiment will also be apparent to those skilled in the art, given the descriptions already provided with reference to these prior figures. The inversion of the tilt and/or curvature of the blade 7' opens the orifice 5 or increases its open cross-sectional area when the air temperature of the flow E decreases, and, reversibly, it reduces this open cross-sectional area or eliminates it when the air temperature of the flow E increases. As is the case for all embodiments of the invention, such an operation is autonomous.

Figure 4:
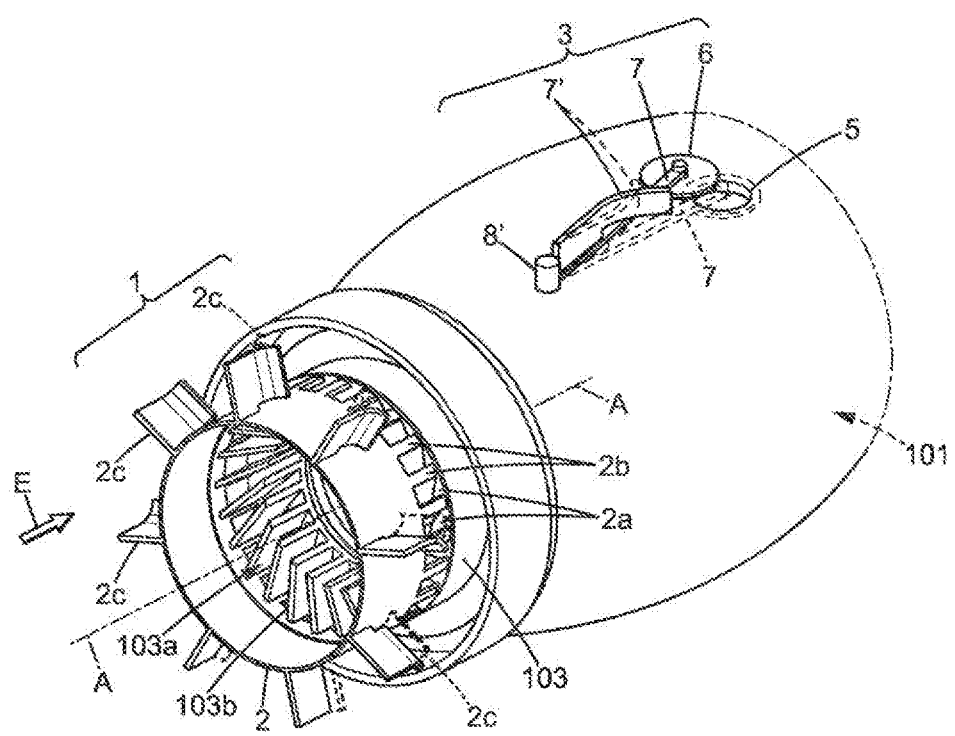
FIG. 4 is a perspective view of a turbine firebox which is in accordance with the invention both at the combustion air supply swirler and at the dilution air inlet.

The embodiments of the invention which correspond to FIGS. 2a-2c or to FIG. 3d, regardless of the implementation of the thermosensitive members (with a portion of shape-memory alloy or with a bimetal strip assembly), are preferred for their simplicity, in particular because of the small number of parts they require. FIG. 4 shows a combination of two of these embodiments: one according to FIGS. 2a-2c, and the other according to FIG. 3d. Such a combination is particularly simple to implement, and then to use with a high level of reliability. In addition, each system with variable opening is advantageously sized so that the total mass flow rate of the air entering the chamber 101, as combustion air via system with variable opening 1 or as dilution air via system with variable opening 3, remains substantially constant during the transitions because the open cross-sectional areas of the systems with variable openings 1 and 3 vary in opposite directions, while maintaining a total cross-sectional area that is substantially constant.

The invention claimed is:
1. A self-adapting gas turbine firebox with variable geometry, comprising:
   a combustion chamber (101);
   an air supply system for supplying air exiting a compressor (200), arranged to supply the combustion chamber (101) with the air having a variable temperature; and at least one system with a variable opening, comprising:
an intake passage, arranged to allow the air coming from the air supply system to enter the combustion chamber (101),
a movable closure member, which changes an open cross-sectional area of the intake passage when moved, and
a thermosensitive member, having a shape which varies depending on a temperature of said thermosensitive member, the thermosensitive member being arranged in a stream of combustion air between the air supply system and the intake passage, and being connected to the closure member so that a deformation of the thermosensitive member causes said closure member to move,
wherein the intake passage is arranged with respect to the combustion chamber (101) so that the combustion air entering said combustion chamber through said intake passage is air which participates in combustion of a fuel in the combustion chamber such that the turbine firebox is self-adapting for automatically adjusting a combustion configuration inside the combustion chamber according to an operational power setting of the turbine firebox,
wherein the at least one system is arranged to vary an intake flow rate of the combustion air coming from the air supply system and entering the combustion chamber (101) through an air supply swirler (103), located axially upstream of said combustion chamber relative to a combustion chamber axis, and
wherein the closure member comprises a ring (2) with openings (2*a*) which laterally surrounds the air supply swirler, so that the openings are aligned or offset relative to channels (103*a*) of said air supply swirler (3), in order to vary a cross-sectional area of an access to said channels according to an angular position of the ring around the air supply swirler, forming the open cross-sectional area of the intake passage.

2. The turbine firebox according to claim 1, wherein the thermosensitive member comprises a portion made of a shape-memory alloy, or comprises a bimetal strip assembly, said bimetal strip assembly being composed of at least two portions ($2c_1$, $2c_2$; $7_1$; $7_1$) made of materials which have different respective values for a coefficient of thermal expansion, and which are connected to each other so that a relative dimensional variation of said two portions of materials, caused by a change in temperature undergone by the thermosensitive member, produces the deformation of said thermosensitive member.

3. The turbine firebox according to claim 2, wherein the thermosensitive member is adapted to provide sufficient energy to cause the closure member to move from an initial position when said thermosensitive member undergoes a first change in temperature from an initial temperature value, and is also adapted to then provide additional energy which is sufficient to cause a reverse movement of the closure member when said thermosensitive member undergoes a second change in temperature following the first change in temperature and in the opposite direction to said first change in temperature so that the closure member is once again in the initial position when the temperature of the thermosensitive member is again equal to the initial value.

4. The turbine firebox according to claim 2, wherein the thermosensitive member is adapted to provide sufficient energy to cause the closure member to move from an initial position when said thermosensitive member undergoes a first change in temperature from an initial temperature value, and the at least one system further comprises at least one return member adapted to produce additional energy which is sufficient to cause a reverse movement of the closure member when said thermosensitive member undergoes a second change in temperature following the first change in temperature and in the opposite direction to said first change in temperature so that the closure member is once again in the initial position when the temperature of the thermosensitive member is again equal to the initial value.

5. The turbine firebox according to claim 2, wherein the at least one system is a first system, and the turbine firebox further comprises a second system with a second variable opening which is arranged to vary an intake flow rate of a stream of dilution air coming from the air supply system and entering the combustion chamber (101) through a side wall of said combustion chamber,
said second system comprising:
a second intake passage, arranged to allow the stream of dilution air coming from the air supply system to enter the combustion chamber (101),
a second movable closure member, which changes an open cross-sectional area of the second intake passage when moved, and
a second thermosensitive member, having a shape which varies depending on a temperature of said second thermosensitive member, the second thermosensitive member being arranged in the stream of dilution air between the air supply system and the second intake passage, and being connected to the second closure member so that a deformation of the second thermosensitive member causes the second closure member to move,
wherein the second intake passage is arranged with respect to the combustion chamber (101) so that the stream of dilution air entering said combustion chamber through said second intake passage is air that participates in a dilution of the gases effective inside the combustion chamber, and
wherein the first and second systems are adapted to simultaneously vary the open cross-sectional areas of the respective first and second intake passages in opposite variation directions when the temperature varies of the streams of air in which are arranged the first and second thermosensitive members.

6. The turbine firebox according to claim 1, wherein the thermosensitive member is adapted to provide sufficient energy to cause the closure member to move from an initial position when said thermosensitive member undergoes a first change in temperature from an initial temperature value, and is also adapted to then provide additional energy which is sufficient to cause a reverse movement of the closure member when said thermosensitive member undergoes a second change in temperature following the first change in temperature and in the opposite direction to said first change in temperature so that the closure member is once again in the initial position when the temperature of the thermosensitive member is again equal to the initial value.

7. The turbine firebox according to claim 6, wherein the thermosensitive member constitutes at least a portion of a blade (2*c*) which is carried by the ring (2), located in the stream of combustion air coming from the air supply system, and adapted to impart tilts or directions of curvature to the blade which are the inverse of one another, between at least two temperature values of the air coming from the air supply system, so as to rotate the ring by aerodynamic force in a first direction or in a second direction opposite to said first direction around the air supply swirler (103).

8. The turbine firebox according to claim 7, wherein the at least one system is arranged to reduce the open cross-sectional area of the intake passage when the temperature of the air coming from the air supply system decreases, and to increase said open cross-sectional area of the intake passage when said air temperature increases.

9. The turbine firebox according to claim 6, wherein the at least one system is a first system, and the turbine firebox further comprises a second system with a second variable opening which is arranged to vary an intake flow rate of a stream of dilution air coming from the air supply system and entering the combustion chamber (101) through a side wall of said combustion chamber, said second system comprising:
- a second intake passage, arranged to allow the stream of dilution air coming from the air supply system to enter the combustion chamber (101),
- a second movable closure member, which changes an open cross-sectional area of the second intake passage when moved, and
- a second thermosensitive member, having a shape which varies depending on a temperature of said second thermosensitive member, the second thermosensitive member being arranged in the stream of dilution air between the air supply system and the second intake passage, and being connected to the second closure member so that a deformation of the second thermosensitive member causes the second closure member to move, wherein the second intake passage is arranged with respect to the combustion chamber (101) so that the stream of dilution air entering said combustion chamber through said second intake passage is air that participates in a dilution of the gases effective inside the combustion chamber, and wherein the first and second systems are adapted to simultaneously vary the open cross-sectional areas of the respective first and second intake passages in opposite variation directions when the temperature varies of the streams of air in which are arranged the first and second thermosensitive members.

10. The turbine firebox according to claim 1, wherein the thermosensitive member is adapted to provide sufficient energy to cause the closure member to move from an initial position when said thermosensitive member undergoes a first change in temperature from an initial temperature value, and the at least one system further comprises at least one return member adapted to produce additional energy which is sufficient to cause a reverse movement of the closure member when said thermosensitive member undergoes a second change in temperature following the first change in temperature and in the opposite direction to said first change in temperature so that the closure member is once again in the initial position when the temperature of the thermosensitive member is again equal to the initial value.

11. The turbine firebox according to claim 10,
wherein the ring (2) carries at least one blade (2c') which is located in the stream of combustion air coming from the air supply system, and which has a fixed tilt or curvature so as to rotate the ring by aerodynamic force towards a rest position, to form the return member, and
wherein the thermosensitive member is arranged to move the ring away from the rest position, by rotating said ring against a force exerted by the return member.

12. The turbine firebox according to claim 11, wherein the at least one system is arranged to reduce the open cross-sectional area of the intake passage when the temperature of the air coming from the air supply system decreases, and to increase said open cross-sectional area of the intake passage when said air temperature increases.

13. The turbine firebox according to claim 10, wherein the at least one system is a first system, and the turbine firebox further comprises a second system with a second variable opening which is arranged to vary an intake flow rate of a stream of dilution air coming from the air supply system and entering the combustion chamber (101) through a side wall of said combustion chamber, said second system comprising:
- a second intake passage, arranged to allow the stream of dilution air coming from the air supply system to enter the combustion chamber (101),
- a second movable closure member, which changes an open cross-sectional area of the second intake passage when moved, and
- a second thermosensitive member, having a shape which varies depending on a temperature of said second thermosensitive member, the second thermosensitive member being arranged in the stream of dilution air between the air supply system and the second intake passage, and being connected to the second closure member so that a deformation of the second thermosensitive member causes the second closure member to move, wherein the second intake passage is arranged with respect to the combustion chamber (101) so that the stream of dilution air entering said combustion chamber through said second intake passage is air that participates in a dilution of the gases effective inside the combustion chamber, and wherein the first and second systems are adapted to simultaneously vary the open cross-sectional areas of the respective first and second intake passages in opposite variation directions when the temperature varies of the streams of air in which are arranged the first and second thermosensitive members.

14. The turbine firebox according to claim 1, wherein the at least one system is a first system, and the turbine firebox further comprises a second system with a second variable opening which is arranged to vary an intake flow rate of a stream of dilution air coming from the air supply system and entering the combustion chamber (101) through a side wall of said combustion chamber, said second system comprising:
- a second intake passage, arranged to allow the stream of dilution air coming from the air supply system to enter the combustion chamber (101),
- a second movable closure member, which changes an open cross-sectional area of the second intake passage when moved, and
- a second thermosensitive member, having a shape which varies depending on a temperature of said second thermosensitive member, the second thermosensitive member being arranged in the stream of dilution air between the air supply system and the second intake passage, and being connected to the second closure member so that a deformation of the second thermosensitive member causes the second closure member to move, wherein the second intake passage is arranged with respect to the combustion chamber (101) so that the stream of dilution air entering said combustion chamber through said second intake passage is air that participates in a dilution of the gases effective inside the combustion chamber, and wherein the first and second systems are adapted to simultaneously vary the open cross-sectional areas of the respective first and second intake passages in opposite variation directions when the temperature varies of the streams of air in which are arranged the first and second thermosensitive members.

15. The turbine firebox according to claim 14, wherein, the second thermosensitive member is adapted to provide sufficient energy to cause the second closure member to move from an initial position when said second thermosensitive member undergoes a first change in temperature from an initial temperature value, and is also adapted to then provide additional energy which is sufficient to cause a reverse movement of the second closure member when said second thermosensitive member undergoes a second change in temperature following the first change in temperature and in the opposite direction to said first change in temperature, such that the second closure member is once again in the initial position when the temperature of the second thermosensitive member is again equal to the initial value, and the second thermosensitive member constitutes a portion of a lever (7) which carries the second closure member, or a portion of a reversible actuator which is arranged to move the second closure member.

16. The turbine firebox according to claim 15, wherein, for the second system, the second thermosensitive member constitutes a portion of a reversible actuator which is arranged to move the second closure member forming at least a portion of a blade (7') which is located in the stream of dilution air coming from the air supply system, the second thermosensitive member being adapted to impart tilts or directions of curvature to the blade which are inverse of one another between at least two temperature values of the air coming from the air supply system, so as to move the closure member by aerodynamic force in a first direction or in a second direction opposite to said first direction in order to reversibly vary the open cross-sectional area of the intake passage.

17. The turbine firebox according to claim 15, wherein the second system is arranged to increase or produce the open cross-sectional area of the intake passage when the temperature of the air coming from the air supply system decreases, and to reduce or eliminate said open cross-sectional area of the intake passage when said air temperature increases.

18. The turbine firebox according to claim 14,
wherein, for the second system, the second thermosensitive member is adapted to provide sufficient energy to cause the second closure member to move from an initial position when said thermosensitive member undergoes a first change in temperature from an initial temperature value, and the second system further comprises at least one return member adapted to produce additional energy which is sufficient to cause a reverse movement of the second closure member when said second thermosensitive member undergoes a second change in temperature following the first change in temperature and in the opposite direction to said first change in temperature such that the closure member is once again in the initial position when the temperature of the thermosensitive member is again equal to the initial value, and a lever (7) which carries the second closure member of the second system and further carries at least one blade (9), which is located in the stream of dilution air coming from the air supply system and which has a fixed tilt or curvature so as to rotate the lever by aerodynamic force towards a rest position to form the return member, and wherein the second thermosensitive member of the second system is arranged to move the lever (7) away from the rest position by rotating said lever against a force exerted by the return member.

19. A turbomachine comprising the compressor (200), the turbine firebox (100) of claim 1, and a turbine (300), the turbomachine being arranged so that the compressor constitutes a source of air for the air supply system of the turbine firebox, and so that gases from the turbine firebox actuate the turbine, the turbine driving the compressor.

20. The turbomachine according to claim 19, forming part of a commercial airliner turbojet engine.

* * * * *